US 008104735B2

(12) United States Patent
Ladd

(10) Patent No.: US 8,104,735 B2
(45) Date of Patent: Jan. 31, 2012

(54) LATCHING MECHANISM FOR HOLDING A REMOVABLE COMPONENT IN A MOUNT

(75) Inventor: Jeffrey C. Ladd, Rochester, NY (US)

(73) Assignee: Ultralife Corporation, Newark, NY (US)

(*) Notice: Subject to any disclaimer, the term of this patent is extended or adjusted under 35 U.S.C. 154(b) by 57 days.

(21) Appl. No.: 12/703,955

(22) Filed: Feb. 11, 2010

(65) Prior Publication Data

US 2011/0192953 A1 Aug. 11, 2011

(51) Int. Cl.
*F16M 13/00* (2006.01)
(52) U.S. Cl. ........................................ 248/544; 248/551
(58) Field of Classification Search .................. 248/544, 248/551, 553, 682, 688, 690, 205.1, 674; 70/85, 86, 88, 208, 210
See application file for complete search history.

(56) References Cited

U.S. PATENT DOCUMENTS

| 3,965,705 | A | * | 6/1976 | Nadler | 70/58 |
| 5,169,114 | A | * | 12/1992 | O'Neill | 248/551 |
| 5,995,366 | A | * | 11/1999 | Howell et al. | 361/679.43 |
| 2004/0261472 | A1 | * | 12/2004 | Shih-Tsung | 70/34 |
| 2011/0068598 | A1 | * | 3/2011 | Penner | 296/37.8 |

OTHER PUBLICATIONS

McDowell Research; AN/PRC-117G Radio Mount; MRC-RMT0003; Fact and Specification Technical Datasheets; Nov. 2009; ulbi.com; 2000 Technology Parkway, Newark, NY 14513; 800-332-5000.
McDowell Research; RMT-2-00-01 Rack Mount Adapter; Technical Datasheet; May 2009; ulbi.com; 2000 Technology Parkway, Newark, NY 14513; 800-332-5000.

* cited by examiner

*Primary Examiner* — Ramon Ramirez
(74) *Attorney, Agent, or Firm* — Duane C. Basch; Basch & Nickerson LLP

(57) ABSTRACT

Disclosed are apparatus and methods for holding a removable component in a rack or similar mount, and more particularly a latching mechanism for holding a radio transceiver in a shock-absorbing mounting rack such as in a vehicle.

25 Claims, 8 Drawing Sheets

LATCHING MECHANISM FOR HOLDING A REMOVABLE COMPONENT IN A MOUNT

Disclosed herein is an improved latching mechanism for holding a removable component in a rack or similar mount, and more particularly a latching mechanism for holding a radio in a shock-absorbing mounting rack such as in a vehicle.

BACKGROUND AND SUMMARY

It is known to use shock-absorbing and similar mounts for telecommunications and other sensitive equipment to be mounted in vehicles, particularly for military, emergency responder and law enforcement use. In many cases, the equipment that is affixed or inserted into such mounts needs to be readily removed, both for service and storage, as well as in emergencies, when the equipment or component stored in the mount needs to removed quickly.

One example of such a mount is the Rack Mount Adapter sold by McDowell Research, an affiliate of Ultralife (Part# RMT-2-00-01). The rack mount adapter allows the easy installation of transceivers with attached power supplies/power adapters in vehicles and shelters. A transceiver with power supply attaches directly to the rack with positive hold down clips fore and aft to assure a positive fit. The rack is also suitable for "jerk-and-run" vehicle installations, aircraft integration and shelter installations. The front hold down function is accomplished by a pair of thumbscrews spaced along the front of the rack to interact with a feature of the transceiver. For removal of the device, the thumbscrews are loosened so that the transceiver can be lifted and then removed from the rack. An improved version is the AN/PRC-117G Radio Mount, (McDowell Research/Ultralife, Part # MRC-RMT0003). The MRC-RMT0003 allows for easy installation of transceivers, particularly those with connected power supplies/power adapters, etc. The mount is designed to be employed in vehicle/shelter installations and may be used to provide a stable mount for various types of components in addition to radios. Such a mount may also protect equipment from shock and vibration with integrated isolators between bottom or base mounting plate and an equipment mounting tray. The mount may be further equipped with a security cable to secure a component (e.g., radio or transmitter) to the mount.

A transceiver, typically with an associated power supply, attaches directly to the mount. As disclosed herein the mount may include mechanism to provide a positive, one-handed, quick release latch to assure the secure attachment of component yet provide for ease of removal. The disclosed mechanism is excellent for "jerk-and-run" vehicle situations, aircraft integration and shelter installations where the mounted component needs to be easily and quickly removed, yet is not susceptible to inadvertently being unlocked from the mount. With respect to vehicle installations, often on a dashboard or console, the mount may be summarized as a stationary vehicular communication tray designed to hold a variety of radios and power supplies and to reduce vibration to such components.

Disclosed in embodiments herein is mechanism, associated with a mount, for releasably locking a component to the mount, comprising: a cradle, attached to said mount; a slide, slidably engaged with said cradle and moving between an engaged and non-engaged position, and having at least one feature thereon for actively engaging a mating surface of the component; a resilient member for biasing said slide toward the non-engaged position; a lever assembly, pivotally inserted into the cradle and including a cammed pivot, a handle and a bearing surface, said bearing surface operatively engaging a surface of said slide and causing said slide to move between the non-engaged position and the engaged position in response to movement of said handle; and a secondary locking mechanism to prevent the unintentional movement of the handle of said lever assembly.

Further disclosed in embodiments herein is a mount for releasably locking a component thereto, comprising: a mounting tray; a lock cradle, attached to said mounting tray; a slide, slidably engaged with said lock cradle and moving between an engaged and non-engaged position, and having at least one feature thereon for actively engaging a mating surface of the component; a resilient member for biasing said slide toward the non-engaged position; a lever assembly, pivotally inserted into the cradle and including a cammed pivot, a handle and a bearing surface, said bearing surface operatively engaging a surface of said slide and causing said slide to move between the non-engaged position and the engaged position in response to movement of said handle; and a secondary locking mechanism to prevent the unintentional movement of the handle of said lever assembly.

The above-described figures are not necessarily drawn to scale and some features may be enlarged to provide emphasis of such features. The various embodiments described herein are not intended to limit the invention to those embodiments described. On the contrary, the intent is to cover all alternatives, modifications, and equivalents as may be included within the spirit and scope of the invention as defined by the appended claims.

DETAILED DESCRIPTION

As more particularly set forth below, the disclosed apparatus and methods provide a locking mechanism that may be used on a vehicular or rack mounting system. Such systems are advantageous to provide a lockable mount, but one that is easily released so that the components locked on the mount may be quickly and easily removed from the mount.

Figure 1:
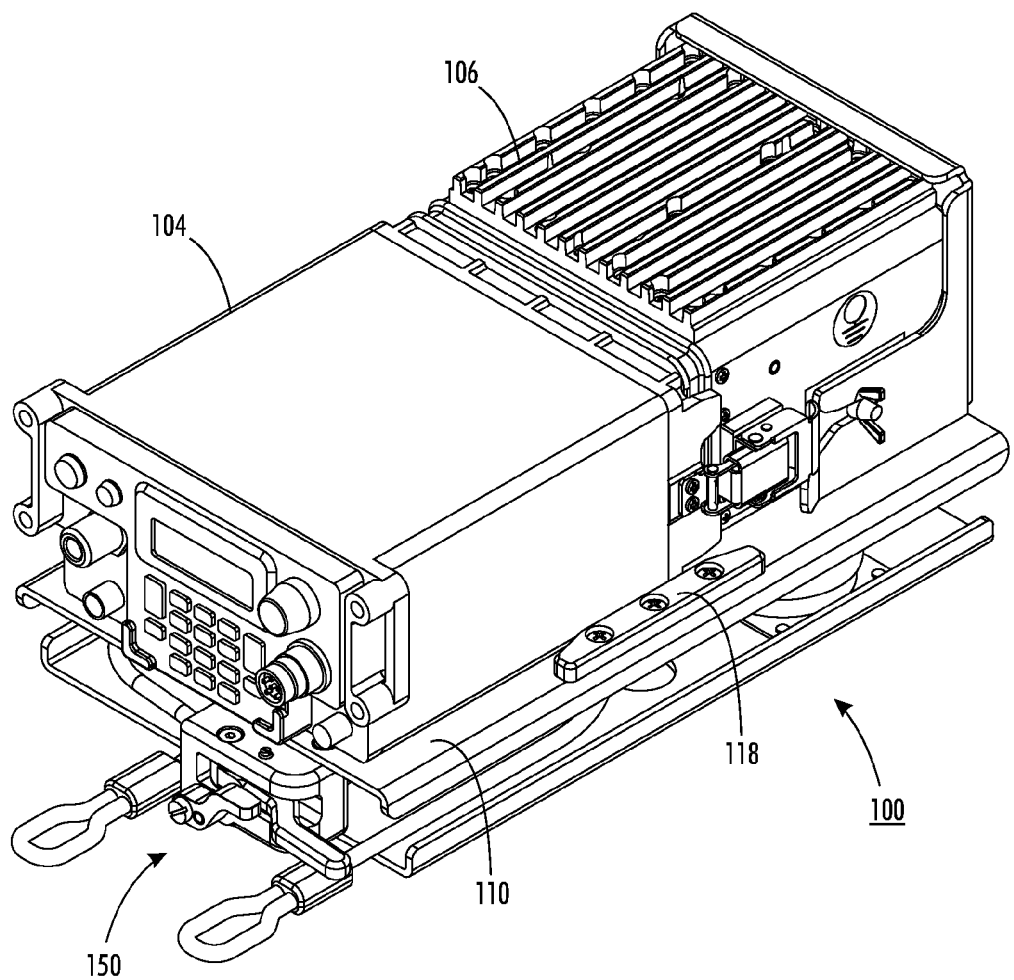
FIG. 1 is a perspective view of a disclosed rack mount embodiment with a transceiver and battery mounted therein.
Figure 2:
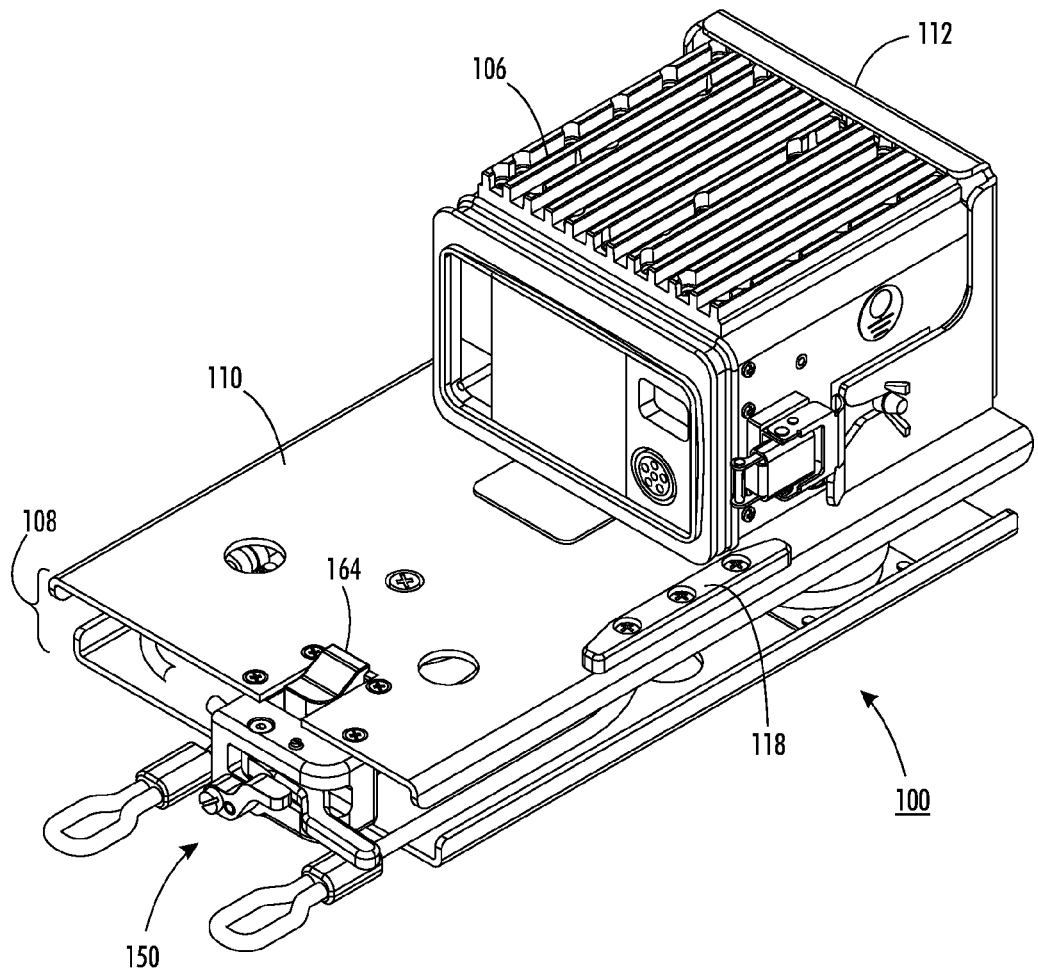
FIG. 2 is a perspective view of the embodiment of FIG. 1, with the transceiver removed to show a locking mechanism.

FIG. 1 illustrates an embodiment of the mounting system 100 with a component (e.g., radio) 104 and an associated battery or power supply 106 mounted thereon. Referring to FIGS. 1 and 2, depicted therein is a rectangular tray 110, which may include a rear support 112, which may be adjustable or removable and may be designed to receive a battery or similar component 106 therein.

Although the size of a tray is dependent upon the component(s) mounted thereon, trays are typically on the order of about 5-15 inches in width and 8-24 inches in length. It will be appreciated that alternative sizes and shapes of the various components are contemplated in accordance with the components to be mounted. The tray is typically made of a metal alloy, such as an aluminum or steel alloy that has been formed and/or machined to its final configuration. It is further contemplated that in some applications plastics or other composite materials may be used for such surfaces. The tray may also include one or more guides 118 or alternative features that mate or engage with similar features on the component(s) that the mount is to support. In order to hold the radio and battery securely, but releasably, in tray 110, the tray is provided with a locking mechanism 150 that is suitable for engaging a component or feature on the radio or other component to be mounted. In one embodiment, such as that depicted in FIG. 6, the locking mechanism provides a locking force to the mating surface of the component 104 to retain the component and prevent from movement relative to the mount in at least two directions.

Figure 3:
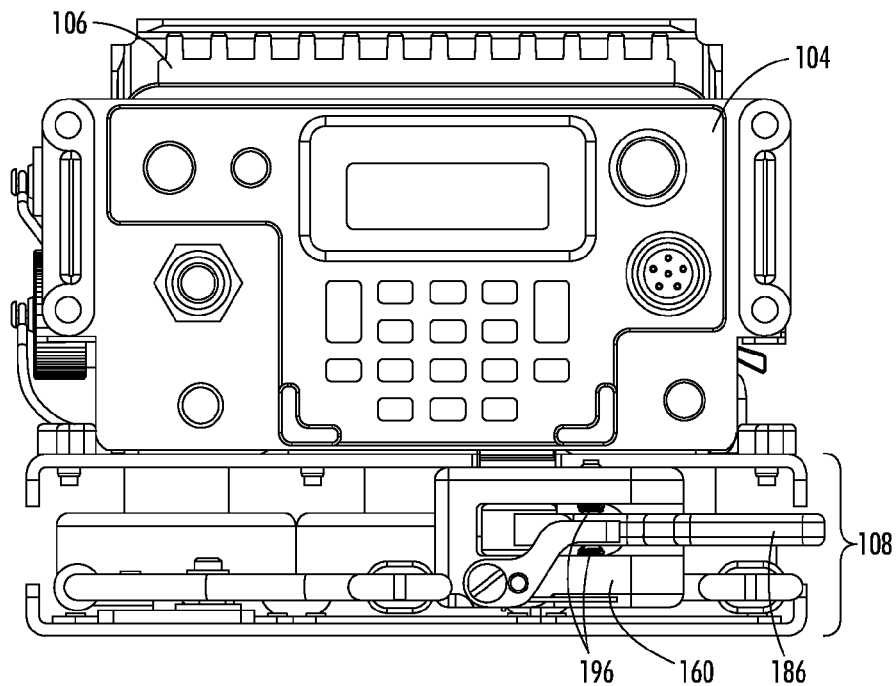
FIG. 3 is a front view of the embodiment of FIG. 1.
Figure 4:
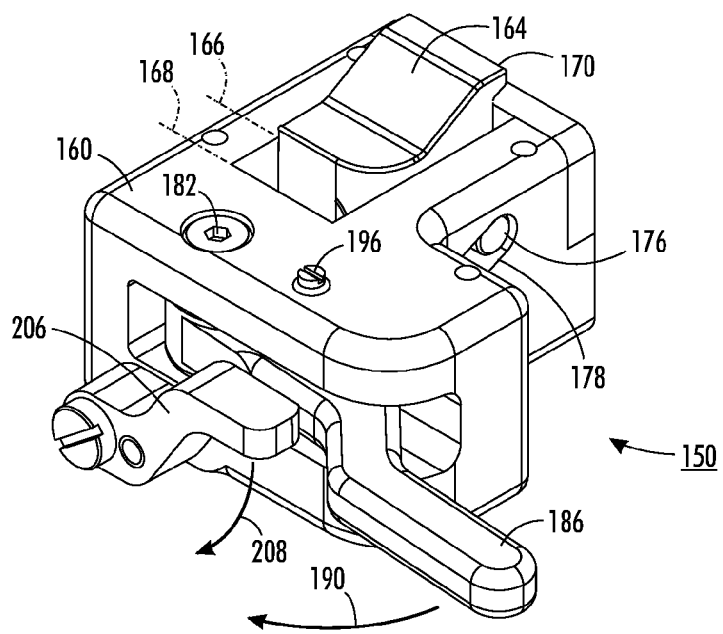
FIG. 4 is an enlarged perspective view of the lock mechanism of FIG. 1.
Figure 5:
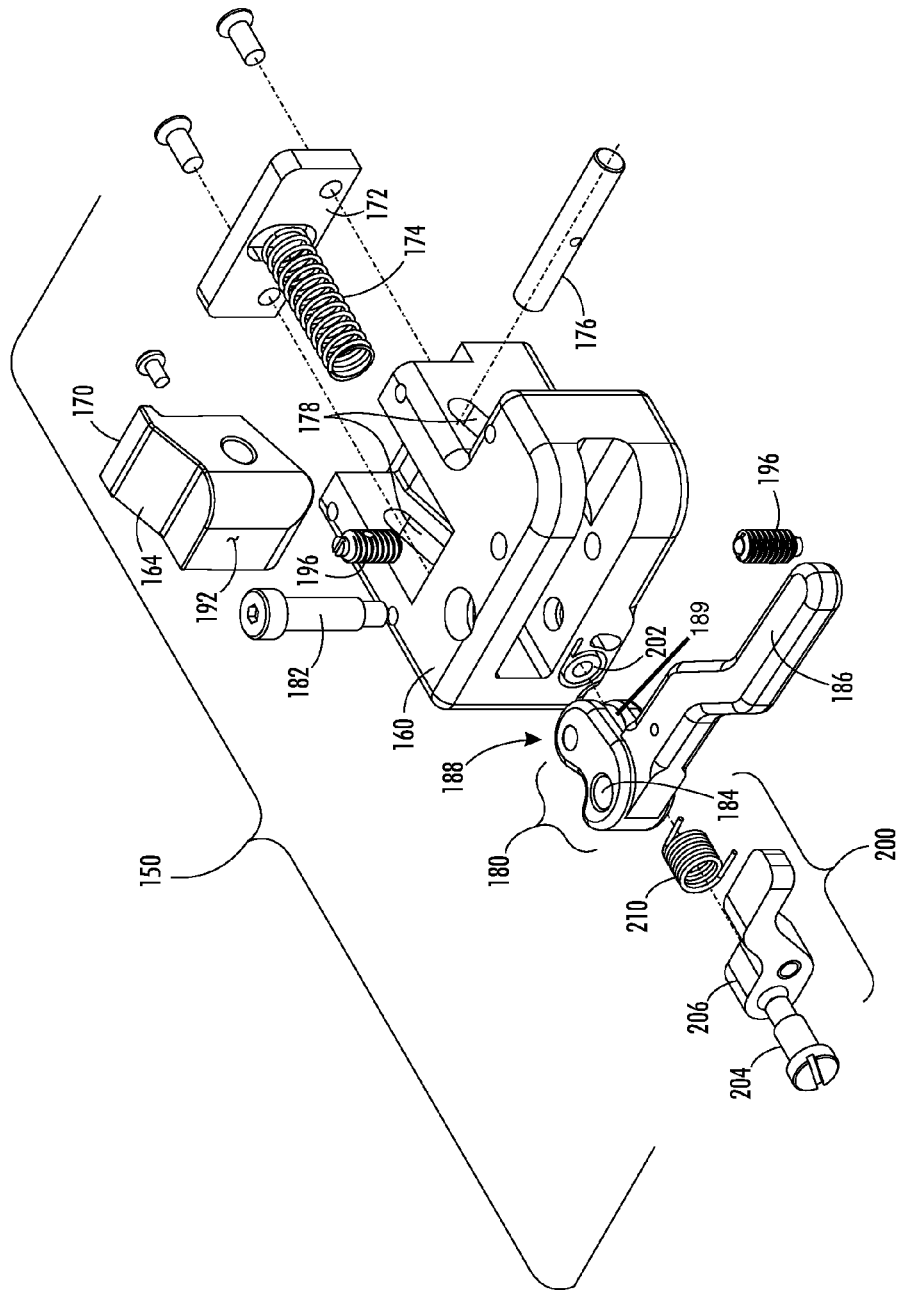
FIG. 5 is an assembly view depicting exemplary components of the mechanism of FIG. 4.

Referring also to FIGS. 3-5, in one embodiment the locking mechanism associated with the mount, includes a cradle 160, which is permanently attached to the tray 110 of the mount or mounting apparatus 108. A slide 164, slidably engaged with the cradle, moves between an engaged and non-engaged position (166, 168, respectively), and has at least one feature (e.g., lip 170 in FIG. 4) thereon for actively engaging a mating surface of the component 104. Various components (e.g., cradle 160, slide 164 and levers 186 and 206) may be formed from an aluminum alloy and may include anodized surfaces for wear resistance and coloration.

The mechanism also includes a resilient member such as a coil spring 174, and an associated backing plate 172, for biasing said slide toward the non-engaged position 168. As the slide 164 moves between the engaged and non-engaged positions, it is limited in its movement by a pin 176 inserted therethrough; the outer ends of the pin are constrained within elongated slots or recesses 178 in the cradle.

Lever assembly 180, inserted and pivotally attached to the cradle 160 using pin 182, includes a cammed pivot 184, a handle 186 and a bearing surface 188. The bearing surface operatively engages surface 192 of slide 164 and causes or motivates the slide to move between the non-engaged position 168 and the engaged position 166 in response to movement of said handle in the direction indicated by arrow 190. In one embodiment, the bearing surface 188 of lever assembly 180 includes a roller bearing 189, which contacts an anodized or similar wear-resistant surface 192 of the slide 164. Lever assembly 180 may be generally held in the engaged position by at least one ball detent 196 to retain the lever assembly in a locked position when the slide is engaged with the component As further illustrated in the figures, a secondary locking mechanism 200 is employed to prevent the unintentional movement of the handle 186 of the lever assembly 180.

In the embodiment depicted in FIG. 5, for example, the secondary locking mechanism 200 includes a pin 204 placed through an aligned hole 202 in the cradle 160, such that lever 206 may be moved in the direction of arrow 208 (FIG. 4) to permit lever 186 to pivot and release the component. A wound spring or similar resilient member 210 is used to bias lever 206 into the position shown in FIG. 4, where it blocks movement of lever 186. As illustrated, the pivot axis of lever assembly 180 is generally perpendicular to a pivot axis of second lever assembly 200.

Figure 8:
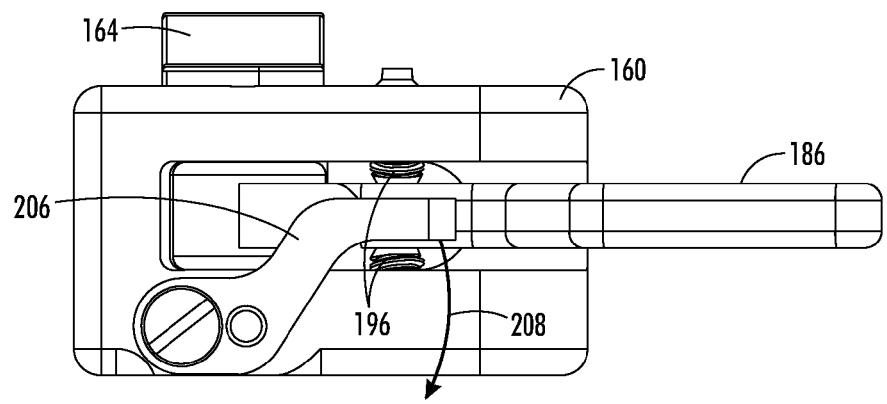
FIG. 8 is a front view of a locking mechanism showing the manner in which the mechanism is operated.
Figure 9:
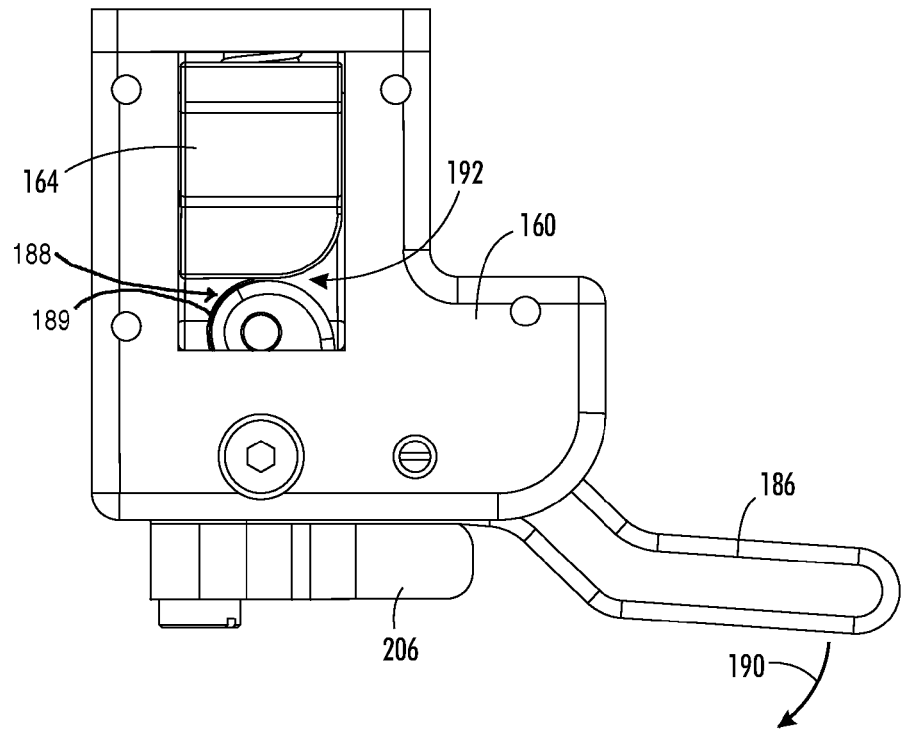
FIG. 9 is a top view of a locking mechanism showing the manner in which the mechanism is operated.

Referring briefly to FIGS. 8 and 9, once the component(s) (e.g. transceiver 104 and battery 106) are placed in the mount and locked by engaging the lever 186 and slide 164, along with the secondary locking mechanism 200, in order to remove the component(s) 104, 106, lever 186 must be moved in the direction of arrow 208, possibly by a user's thumb. While lever 206 is held in the downward position, lever 186 must be moved in the direction of arrow 190, possibly by a user's finger(s). Thus, the locking mechanism requires at least two concurrent actions in order to release the component from the mount. More specifically, secondary locking mechanism 200 includes a second lever 206, pivotally attached to cradle 160 adjacent the lever assembly 180, where the second lever 206 is positioned to limit movement of the lever assembly 180 when the second lever is in a locked position, yet permitting movement of the lever assembly 180 when the second lever is pivoted downward to an open position.

Figure 10:
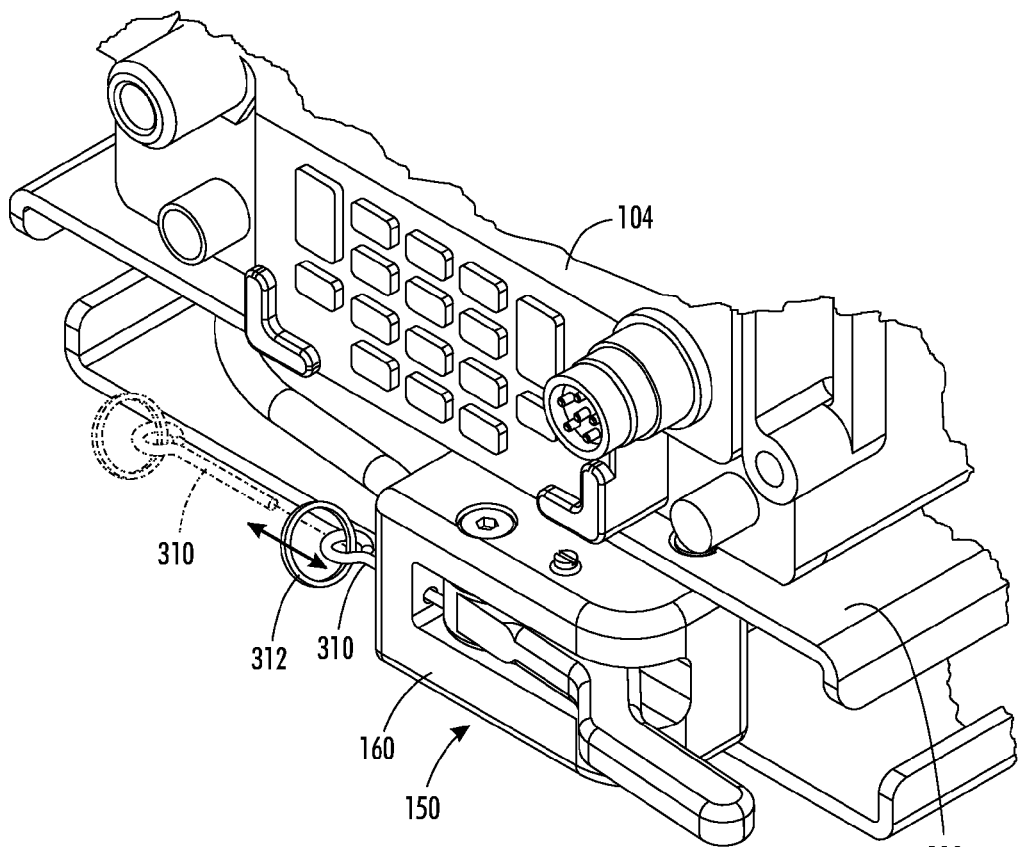
FIG. 10 is a perspective view of an alternative embodiment of the mount of FIG. 1, with a locking mechanism employing a pin as a secondary lock.

In an alternative to the embodiment depicted in FIGS. 8 and 9, the secondary locking mechanism 150 depicted in FIG. 10 includes a pin 310 that is placed through aligned holes in the cradle 160 and lever assembly 180. When the pin is inserted, the lever 186 is prevented from moving and thus cannot allow the slide to disengage unless the pin is removed. In order to avoid the loss of pin 310, it is connected to the mount via a flexible chain or cord 312.

Figure 6:
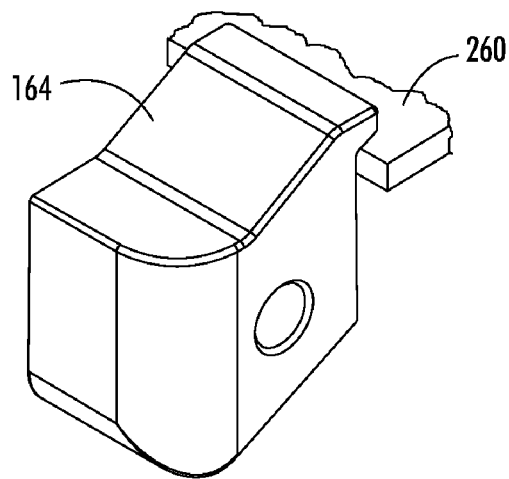
FIGS. 6 and 7 are detailed illustrations of the manner in which a locking mechanism might interactively retain a component in a mount.
Figure 7:
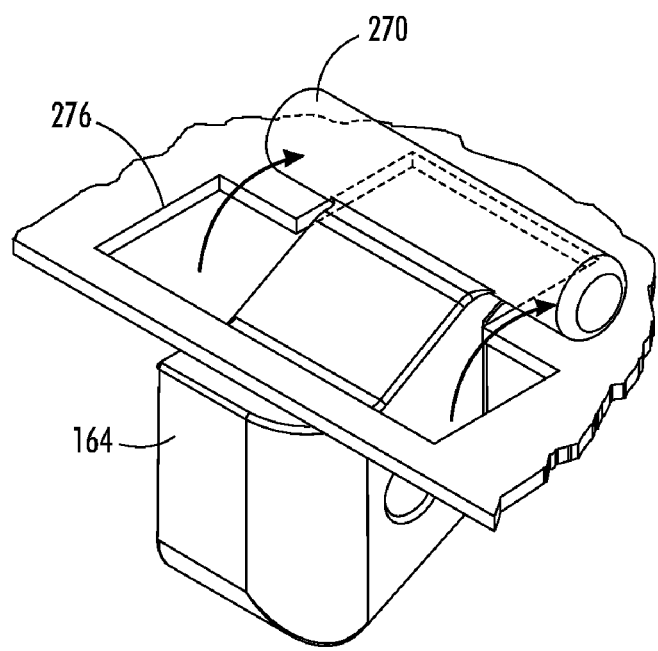

Referring now to FIGS. 6 and 7, the locking mechanism 150 provides a locking force to a mating surface of the component to retain the component in or on tray 110, and prevents from movement of the component relative to the mount in at least two directions. As illustrated above and in FIG. 6, the locking mechanism includes a slide 164 and a lip or similar feature 260. However, alternative configurations of the slide/lip are possible so long as the interaction between the locking mechanism and the component is a positive force that precludes movement of the component relative to the tray. Depicted in FIG. 7 is such an alternative, where instead of a lip, the slide includes a T-shaped feature 270 that is inserted into a recess in the bottom of the component, and as the slide is moved the feature 270 operatively engages the edges of a slot 276 in the component, thereby holding the component relative to the tray.

Figure 11:
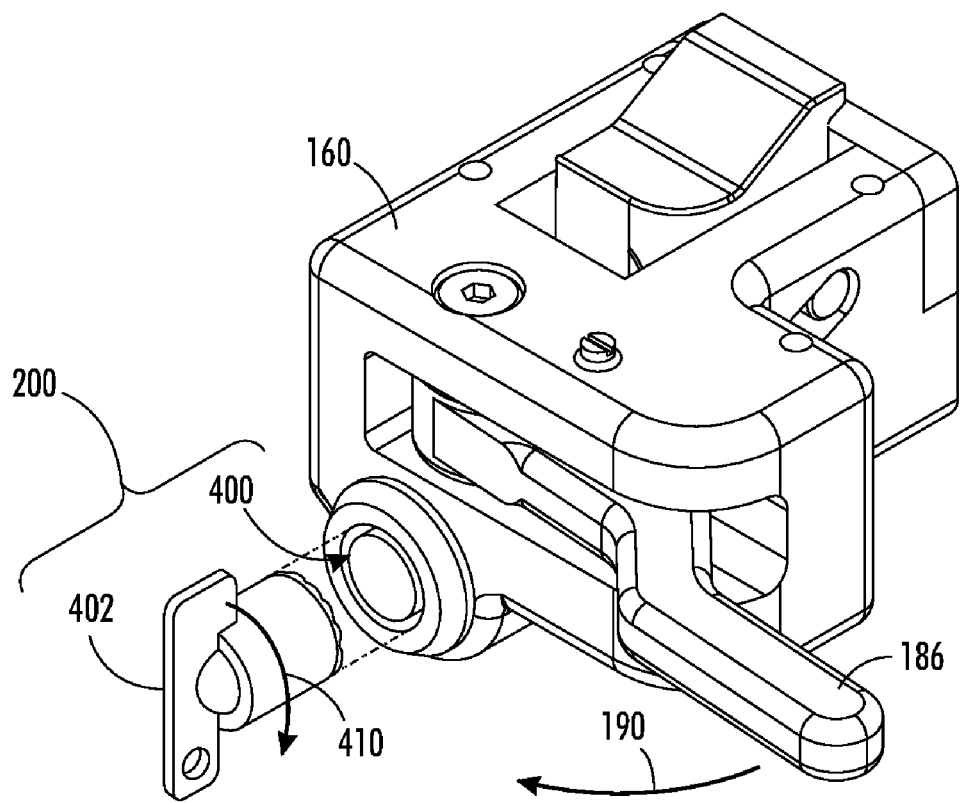
FIG. 11 is a perspective view of another alternative embodiment with a locking mechanism employing a key-type secondary lock.

In an alternative embodiment as depicted in FIG. 11, there is depicted a version having a key lock as the secondary locking mechanism 200. In the illustrated example a cylinder key type lock 400 is used although it will be appreciated that other lock alternatives may be used. The advantage of the cylindrical lock is that it may be spring-loaded, and thereby require the concurrent insertion and turning of a key 402 in the direction of arrow 410 in order to allow lever 186 to be pulled outward. A further advantage of a keyed lock as the secondary locking mechanism is that it acts as a theft deterrent for the radio or other component that is thereby locked to the mount. Accordingly, the secondary locking mechanism 200 may include a keyed lock operatively associated with or connected to the cradle that prevents movement of the lever assembly when locked.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A mechanism, associated with a mount, for releasably locking a component to the mount, comprising:
   a slide, operatively associated with the mount for moving between an engaged and non-engaged position, and having at least one feature thereon for actively engaging a mating surface of the component;
   a lever assembly, including a cammed pivot, a handle and a bearing surface, said bearing surface operatively engaging a surface of said slide and causing said slide to move between the non-engaged position and the engaged position in response to movement of said handle; and
   a secondary locking mechanism to prevent the unintentional movement of the handle of said lever assembly.

2. The mechanism according to claim 1, further comprising a cradle, attached to said mount, wherein said slide is slidably engaged with said cradle and said lever is pivotally inserted into the cradle.

3. The mechanism according to claim 2, further comprising a resilient member for biasing said slide toward the non-engaged position.

4. The mechanism according to claim 3 wherein the bearing surface of said lever assembly includes a roller bearing.

5. The mechanism according to claim 3, wherein said secondary locking mechanism includes a pin placed through aligned holes in said cradle and lever assembly.

6. The mechanism according to claim 3, wherein said secondary locking mechanism includes a keyed lock in said cradle that prevents movement of said lever assembly when in a locked configuration.

7. The mechanism according to claim 3, wherein said secondary locking mechanism includes a second lever, pivotally attached to said cradle adjacent the lever assembly, said second lever positioned to limit movement of the lever assembly when said second lever is in a locked position and permitting movement of the lever assembly when said second lever is pivoted to an open position, said second lever biased to the locked position by a resilient member operatively associated with the second lever and the cradle.

8. The mechanism according to claim 3, wherein the feature on said slide provides a locking force to the mating surface of the component to retain the component and prevent from movement relative to the mount in at least two directions.

9. The mechanism according to claim 8 wherein said feature is in the shape of a lip.

10. The mechanism according to claim 8 wherein said feature is in the shape of a "T."

11. The mechanism of claim 7, wherein a pivot axis of said lever assembly is generally perpendicular to a pivot axis of said second lever.

12. The mechanism of claim 1 further comprising at least one ball detent to retain the lever assembly in a locked position when the slide is engaged with the component.

13. A mount for releasably locking a component thereto, comprising:
   a mounting tray;
   a lock cradle, attached to said mounting tray;
   a slide, slidably engaged with said lock cradle and moving between an engaged and non-engaged position, and having at least one feature thereon for actively engaging a mating surface of the component;
   a lever assembly, pivotally inserted into the cradle and including a cammed pivot, a handle and a bearing surface, said bearing surface operatively engaging a surface of said slide and causing said slide to move between the non-engaged position and the engaged position in response to movement of said handle; and
   a secondary locking mechanism to prevent the unintentional movement of the handle of said lever assembly.

14. The mechanism of claim 13 further comprising at least one ball detent to retain he lever assembly in a locked position when the slide is engaged with the component.

15. The mechanism according to claim 13, further comprising a resilient member for biasing said slide toward the non-engaged position.

16. The mechanism according to claim 15 wherein the bearing surface of said lever assembly includes a roller bearing.

17. The mechanism according to claim 15, wherein said secondary locking mechanism includes a pin placed through aligned holes in said cradle and lever assembly.

18. The mechanism according to claim 15, wherein said secondary locking mechanism includes a keyed lock associated with said cradle that prevents movement of said lever assembly when locked.

19. The mechanism according to claim 15, wherein said secondary locking mechanism includes a second lever, pivotally attached to said cradle adjacent the lever assembly, said second lever positioned to limit movement of the lever assembly when said second lever is in a locked position and permitting movement of the lever assembly when said second lever is pivoted to an open position, said second lever biased to the locked position by a resilient member operatively associated with the second lever and the cradle.

20. The mechanism of claim 19, wherein a pivot axis of said lever assembly is generally perpendicular to a pivot axis of said second lever.

21. The mechanism according to claim 15, wherein the feature on said slide provides a locking force to the mating surface of the component to retain the component and prevent from movement relative to the mount in at least two directions.

22. The mechanism according to claim 21 wherein said feature is in the shape of a lip.

23. The mechanism according to claim 21 wherein said feature is in the shape of a "T."

24. A method for releasably unlocking a component from a mount, comprising:
   disengaging a secondary locking mechanism from interfering with the operation of a lever assembly, the lever assembly operatively contacting a surface of a slide, where the slide thereby engages at least one mating feature on the component to hold the component in the mount;
   while disengaging the secondary locking mechanism, moving the lever assembly and thereby moving the slide and causing the slide to disengage from the mating surface of the component, thus freeing the component for removal from the mount.

25. The method according to claim 24 wherein the secondary locking mechanism is selected from the group consisting of: a pin, a pivotable lever, and a keyed lock.

* * * * *